Aug. 9, 1927.  V. LINK  1,638,587
SPRING SHACKLE
Filed Jan. 5, 1924
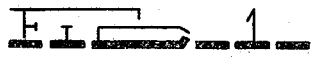
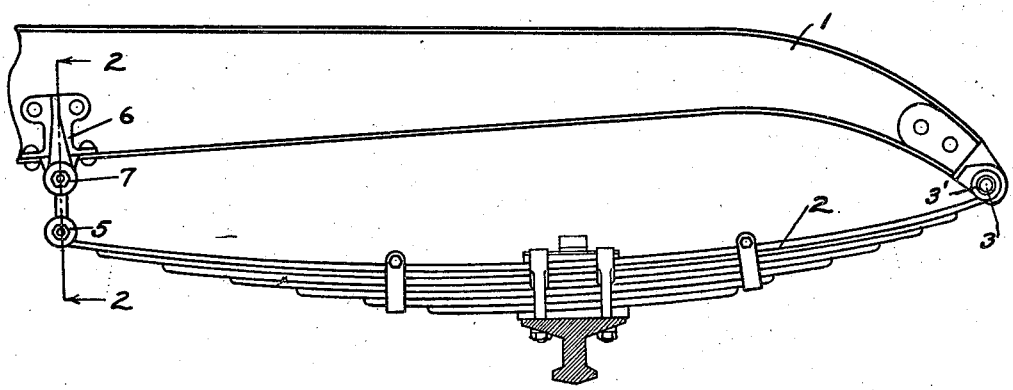
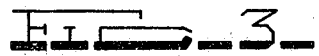
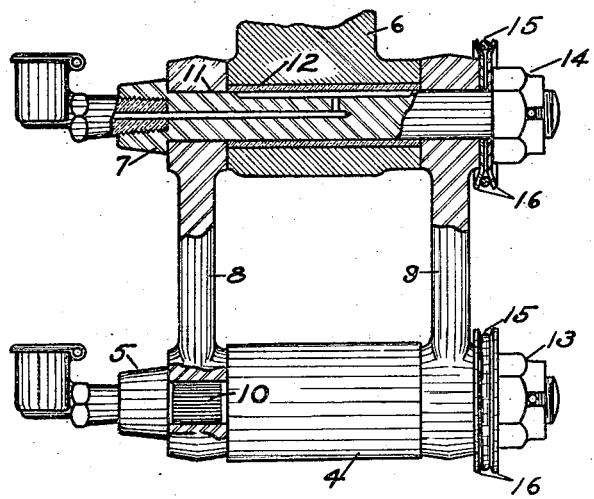
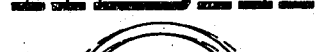
INVENTOR
VINCENT LINK
BY
*P. W. Pomeroy*
ATTORNEY Patented Aug. 9, 1927.

1,638,587

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

SPRING SHACKLE.

Application filed January 5, 1924. Serial No. 684,588.

This invention relates to spring securing devices for vehicles and the principle object is to provide means for taking up the lateral wear thereof.

Another object is to provide two specially shaped washers, together with a radially contractible split spring ring therebetween, positioned between two lateral wearing surfaces of a vehicle spring securing device.

A further object is to provide a shackle in which no further lateral adjustment will be necessary after the shackle is once assembled.

A still further object is to provide a small, compact device of the class described which will be neat appearing, economical to manufacture and will operate efficiently.

It is known that much of the annoying rattle developed in an automobile after a period of use is caused by lateral wear between the eyes of the spring and its hanger, and the shackle, allowing them to have a limited freedom of movement along the axis of the shackle bolts. Change of direction in the side thrust on the wheels causes the spring eyes to move on the shackle bolts in the direction of the thrust, and the eyes come up against the shackle with a snap or a rattle.

My invention consists in automatically taking up the wear between the parts mentioned by a resilient means. This taking up of wear by resilient means is accomplished by placing two washers on each of the two shackle bolts, either between the spring hanger and either of the link members, or between the nuts of the shackle bolts and the adjacent link member. The washers have a portion of their outer surface formed to the shape of a frustum of a cone and are placed adjacent each other with the conical surfaces extending outwardly and away from each other, with a split spring ring seated between them against the conical surfaces. The split spring ring, seated between the two inner tapered surfaces of the washers, having been previously sprung outward in assembling or otherwise, has a tendency to contract and force the washers apart.

The above being among the objects of the present invention, the same consists of certain features of construction and combinations of parts to be hereinafter described and then claimed with reference to the accompanying drawings, which illustrate a suitable embodiment of the invention having the above and other objects in view.

In the drawings:

Figure 1 is a side elevation of a vehicle frame side member, spring and spring shackle to which my invention is applied.

Figure 2 is an enlarged view of a fragmentary section of the spring shackle taken on the line 2—2 of Figure 1.

Figure 3 is a side elevation of one of the washers, showing, by a dotted line, the split spring ring in position.

Figure 4 is a side elevation of the spring ring before assembly, the dotted line showing the spring ring sprung out just before or during assembly.

Referring more in detail to the drawing in which like numerals refer to like parts, I have shown the front portion of a motor vehicle having semi-elliptical springs, although it should be understood that my invention is susceptible of wide application to spring suspensions of many different types.

In Figure 1, I have shown a portion of a vehicle frame side member 1 to which the vehicle spring 2 is fastened at its outer end, by means of a spring bolt 3 and the spring eye 3'. The other end of the vehicle spring 2 is connected to the frame side member 1 by a shackle which has its lower end pivoted to the spring eye 4 by a bolt 5 and which has its upper end pivoted to the spring hanger 6 by a bolt 7.

The shackle, in part, comprises two link members 8 and 9 connected by the bolts 5 and 7, which have corrugated shoulders 10 and 11, respectively, held rigidly in the link member 8 by means of a press fit. The spring eye 4 and the spring hanger 6 are located between the link members 8 and 9, which in the case illustrated carry the bushings 12, the bushing not being seen in the spring eye 4 as the same is not shown sectioned. The bushings 12 form the usual bearing surfaces between the bolt 5 and the spring eye 4, and the bolt 7 and the hanger 6. The link member 9 is held in position on the bolts 5 and 7 by the nuts 13 and 14 respectively.

As explained, in the usual operation of a motor vehicle, wearing of the lateral surfaces occurs between the shackle links 8 and 9 and hanger 6, and between the links 8 and 9 and the spring eye 4, and also between the nuts 13 and 14 and link 9. This wear allows a lateral movement of the hanger 6 along the bolt 7 and of the spring eye 4 along the bolt 5. When a change of the lateral thrust on the vehicle wheels occurs, the spring eye 4 moves along the bolt 5 until it is stopped by either the link 8 or 9 as the case may be, and then carries the links 8 and 9 along the bolt 7 until the upper end of one of them comes in contact with a lateral face of the hanger 6. When there is appreciable wear between the above mentioned lateral surfaces, and when the change in direction of side thrust is very rapid, there is a distinct sound or "click" produced by the meeting of the lateral faces as described. As the wear increases the amount which these parts may move laterally, the sound produced, of course, increases due to the greater momentum that the parts may gather in the greater distance they move. When the direction of side thrust is rapidly changed, as is often the case when a vehicle is moving over a rough roadway, the sound produced by the lateral motion of the parts described becomes an annoying rattle and cannot be eliminated in the prevailing constructions except by considerable annoyance and labor.

The means shown in the drawings for automatically taking up this lateral wear and thereby preventing rattling of the parts consists of two washers 16 and a split spring ring 15. A portion of the washers 16 near their circumference is formed to the shape of a frustum of a relatively flat cone. Two washers 16 are placed between each nut 13 and the adjacent face of the link 9 around the bolt 5 or 7 as the case may be, with the conical surfaces extending outwardly away from each other. The split spring ring 15 is placed between the washers 16 and seats against the conical surfaces thereof. The ring 15 in assembling or otherwise is sprung radially outwardly and therefore has a natural tendency in operation to contract radially inwardly thus tending to force the washers 16 apart and thereby taking up any wear of the lateral surfaces of the links 8 and 9, hanger 6, or spring eye 4, and therefore eliminating a possibility of a rattle due to lateral motion of these parts. It is, of course, evident that the placing of the ring 15 and washers 16 is not restricted to the location shown in the drawings, but may be placed between any two adjacent lateral wearing surfaces and effect the same result.

It will be seen that this means affords a very small, compact construction which is not unsightly in appearance, is efficient in operation, and is economical to manufacture and use.

It is to be understood that the foregoing description is for the purpose of illustration only and that formal changes may be made in the specific embodiment of the invention described without departing from the spirit or substance of the broad invention, the scope of which is commensurate with the appended claims.

What I claim is:—

1. An anti-rattling device comprising two washers having a portion of their outer surfaces formed to the shape of a frustum of a cone, and a split spring ring contractible in a radial direction only seated against said surfaces.

2. A device for taking up the lateral wear between two pivotally connected parts, comprising two adjacent members, one of which is provided with a face extending outwardly away from the other of said members, and resilient means contractible in a radial direction only seated against said face of said member and against the adjacent face of the other of said members to force said members apart.

3. An anti-rattling device comprising two washers having a portion of their outer surfaces formed to the shape of a frustum of a cone, and resilient means seated against said conical surfaces tending to contract in a radial direction only to force said members apart.

4. An anti-rattling device comprising two members positioned between two adjacent lateral wearing faces, and a spring contractible only in a radial direction seated between and against said members, said spring tending to force said members apart.

5. A device for automatically taking up the ware between lateral wearing surfaces, comprising two members seated between said surfaces, said members having a portion of their adjacent faces extending outwardly away from each other, and a resilient split spring ring contractible in a radial direction only seated against said faces tending to separate said members.

Signed by me at Detroit, Michigan, U. S. A. this 31st day of December, 1923.

VINCENT LINK.